United States Patent [19]

Cencier

[11] 4,173,781
[45] Nov. 6, 1979

[54] SYSTEM OF COHERENT MANAGEMENT OF EXCHANGES BETWEEN TWO CONTIGUOUS LEVELS OF A HIERARCHY OF MEMORIES

[75] Inventor: Lucien Cencier, Conflans St Honorine, France

[73] Assignee: Compagnie Internationale pour l'Informatique Cii-Honeywell Bull, Paris, France

[21] Appl. No.: 776,359

[22] Filed: Mar. 10, 1977

[30] Foreign Application Priority Data

Mar. 10, 1976 [FR] France .................. 76 06879

[51] Int. Cl.² .................. G06F 13/00; G11C 9/06
[52] U.S. Cl. .................. 364/200
[58] Field of Search ... 364/200 MS File, 900 MS File

[56] References Cited

U.S. PATENT DOCUMENTS

| | | | |
|---|---|---|---|
| 3,581,291 | 5/1971 | Iwamoto et al. | 364/200 |
| 3,588,839 | 6/1971 | Belady et al. | 364/200 |
| 3,771,137 | 11/1973 | Barner et al. | 364/200 |
| 3,820,078 | 6/1974 | Curley et al. | 364/200 |
| 3,911,401 | 10/1975 | Lee | 364/200 |
| 3,938,097 | 2/1976 | Niguette | 364/200 |
| 4,077,059 | 2/1978 | Cordi et al. | 364/200 |

Primary Examiner—Gareth D. Shaw
Assistant Examiner—Michael C. Sachs
Attorney, Agent, or Firm—Cameron, Kerkam, Sutton, Stowell & Stowell

[57] ABSTRACT

In order to provide for coherence of exchanges between a block of data of a lower speed level and several blocks of data of a contiguous level of higher speed, a control table of the block of the lower speed level registers page by page at least those blocks of the higher speed level which have received extracts from those pages; a control table of each of the blocks of the higher speed level registers by itself, page by page, the number of those extracts and also registers the validity of the data contained in its block, and preferably also the modifications of those data, and in certain cases the exclusion of access of other blocks of the higher speed level to those data; and an organization of the control of these data makes it possible to provide for the required coherence, starting with the information identified above.

Applications: Information science systems with a hierarchy of memories.

4 Claims, 5 Drawing Figures

SYSTEM OF COHERENT MANAGEMENT OF EXCHANGES BETWEEN TWO CONTIGUOUS LEVELS OF A HIERARCHY OF MEMORIES

BACKGROUND AND OBJECTS OF THE INVENTION

The present invention concerns the management of the flows or transfers of information within a hierarchy of memories, and particularly between two contiguous levels of memories, the faster one of which is used by instruction processors, the one or ones of the lower speed levels being managed only by circuits which can be called (control processors), such circuits existing at a higher speed level in addition to, or in combination with, instruction processors.

Hierarchies of memories are now being generally used in the information processing equipments, because they make it possible to dispose of a memory space as large as possible, for example, currently now of about a billion octets, without the costs becoming prohibitive, as in this hierarchy the various technologies participate in reverse proportion to their own costs. As a result, one can introduce—or at least hope to introduce—in the fastest memories, those which are normally associated with instruction processors, the most useful information with an apparent average access time of the order of the time of the cycle of the fastest part of the hierarchy, for a total capacity equal to that of the lowest speed level.

The management of the levels of such a hierarchy of memories poses, inter alia, the problem of the coherence of information flows between different levels of this hierarchy. Such problem exists each time a level contains several blocks with autonomous control, which hold a dialog with the same block of a lower speed level during the processing of data which can be modified at the higher speed level, in the course of implementation of a task which has exclusive or non-exclusive access to modifiable information. Incoherence can occur, when copies of the same original information may exist and be modified in several independent blocks of this higher speed level. One refers here by the term "block" to any part of memory or any memory unit which, in a level, is managed in an autonomous way by a local control processor, which may be confused, at least at the highest speed level, with one or several of the instruction processors which exist there.

In accordance with current terminology, one will designate by a page the smallest quantity of information existing at a level of the hierarchy which can be exchanged with the contiguous lower speed level, while this page can be divided into fragments for exchanges with the contiguous higher speed level. Usually, the size of the page is a power of two, and it is convenient for the exchanges that the pages of a level are of a size multiple of those of the contiguous higher speed level.

A table or repertory of status word is most often associated with the control processor of each block such a repertory of status words comprises as many entries as there are pages in the block, or even as many entries as fragments of pages. Each word of the repertory includes at least one information address and status bits concerning the said information.

In French patent specification 75 12 014 filed 17 Apr. 1975 for "Method and Means for a Coherent Management of Information in a Hierarchy of Memories" (Invention by Paul FEAUTRIER), the assignee of the present application described a method which is characterized in a general manner by the fact that each control processor of a block of the higher speed level, cooperating with a determined plurality of blocks of the higher speed level, each of them associated with a control processor and/or instruction processor, memorizes for each page of the block, in the entry of its repertory corresponding to that page, the read-out operations directed to—and write-in operations as well as operations signalling ejection which are coming from—the highest speed level, and by the fact that each time a request is made to read a fragment of a page of the block, the control processor of this block consults the contents memorized in the given entry of the repertory, in order to determine whether this request can be satisfied immediately, or whether the blocks of the higher speed level, which previously have received fragments of the same page, should first have these copies eliminated from them. Such an elimination opertaion may be called a "purge".

According to a special method of implementation of the method, each page entry, of the repertory of the lower speed level is subdivided into as many places of memorization of these operations as there are blocks at the higher speed level. If necessary, each of such places can be in turn subdivided into as many places of memorization as there are fragments on the page of the block of the lower speed level.

When the items of information are provided, at least for each page of the block the lower speed level, with a marker index indicating whether the information is modifiable or not at the higher speed level, the consultation of the table by the control processor of the lower speed level also applies to that index. When the information is thus determined as being non-modifiable, the request for reading is complied with immediately, without a priorly executed purging operation.

The modalities of the use of this method have revealed in actual practice certain counterparts which contribute to the slowdown of the exchanges between the different levels, and especially between the fastest level, usually managed by instruction processors carrying out each of the programs of tasks the profession of which requires numerous exchanges between their autonomous blocks and that of the lower speed level, which serves them and is managed by a simple control processor. It is plainly understandable that full coherence must be most strictly observed between these two levels.

In the said French patent, the management of the exchanges is in fact assumed entirely at the lower speed level. The memorization and the accounting of the exchange operations is in charge of the repertory of the status words, or "table", which is associated with the autonomous control processor of a block of the lower speed level. The management of the exchanges is thus depending on the access delays of this lower speed level. The decision of purge operations is taken at this lower speed level and, accordingly, each order of purge carried out in this way does not discriminate, at the higher speed level, between the fragments of the page which it orders to be recopied in the block of the higher speed level. This means "repatriation" of as well the information which cannot be modified, for example information concerning the programs, as well as information which can be modified were not, and even modifiable information which had been modified but which belongs only to the task in progress in the processor associated with the block concerned of the higher speed level. Consequently there is a loss of time and therefore a decrease of efficiency, which is often greater than desirable, because each "repatriation" requires a time for access which is the one of the block of the lower speed level. Posting in the table an index specifying that the information is determined to be modifiable or non-modifiable at the higher speed level, reduces the number of purging orders, but it does not reduce the duration of execution of each other, and such reduction is hindered in some way by the fact that such index can be applied only to the entire content of a page of the block of the lower speed level, in order not to unduly increase the capacity of the table associated with each control processor of the lower speed level. Even if this index was applied to each fragment and in order to make sure that such indexing could be validly applied, it would be necessary that the decision be made at the higher speed level during the transfer of the fragment, and consequently the decision would have to be transferred back to the lower speed level for memorization, which would clearly result in a loss of time.

SUMMARY OF THE INVENTION

The purpose of the present invention is to provide a new system of coherent management which would not have the inconveniences noted with regard to the above summarized system, and at the same time would not increase unduly the amount of material necessary of its reduction to practice.

In accordance with the present invention there is provided a system of coherent management of the exchanges between two contiguous levels, one of which is of higher speed than the other, of a hierarchy of memories. Each level is divided in separate data blocks. A page of each block of the higher speed level equals a fraction of a page of each block of the lower speed level. Each block of the lower speed level exchanges information with a plurality of blocks of the higher speed level.

Each block of each level being managed by a control processor has at least one associated table of status words. The table is updated by said control processor in response to each read-out and write-in request in said block and at each ejection of data from the block.

Each control processor of a block of the lower speed level, when receiving a read-out request from a block of the higher speed level, may, on consultation of its table, decide to purge the blocks of the said plurality of blocks of the higher speed level of the fractions of the data addressed in the read-out request by repatriating the copies of such fractions existing in the blocks of the said plurality. Each control processor of a block of the lower speed level, when receiving a write-in request from a block of the higher speed level, may, on consultation of its table, decide to update the copies of fractions of the data addressed in said write-in request existing in the blocks of the said plurality at the higher speed level.

Each table associated to a block of the lower speed level comprises as many entries as are pages in the block and, in each of its entries, comprises means to memorize the read-outs from the page corresponding to this entry and the identifications of the blocks of the higher speed level to which the read-outs send copies of fractions of the page. Each table associated to a block of the higher speed level comprises as many entires as are pages in the block of the lower speed level with which it is in data exchange relation and, in each of its entries, comprises means to book an updated count of the copies of the fractions of the page of the block of the lower speed level corresponding to the entry and to concomitantly memorize an updated identification list of the pages of the block of the higher speed level which contain such copies, and comprises means for signalling the passage to zero of each of the said counts to the block of the lower speed level. Operation of the system is such that each control process or a block of the lower speed level is kept posted of the status of the copies of all fractions of data of its block within the blocks of the said plurality of the higher speed level.

SHORT DESCRIPTION OF THE DRAWING

DETAILED DESCRIPTION

Figure 1:
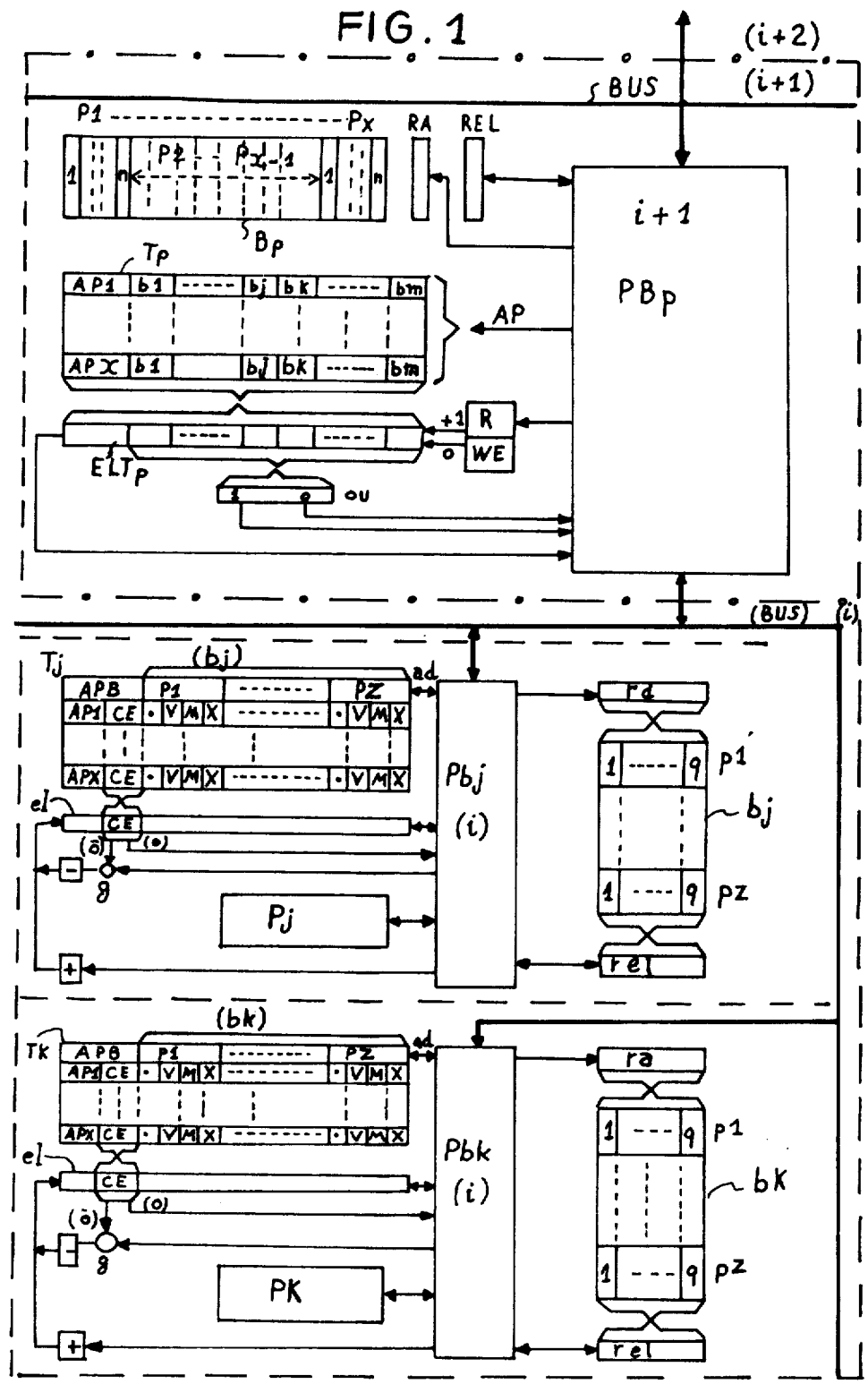
FIG. 1 shows a preferred embodiment of a system according to the invention restricted to one block at the lower speed level and two blocks at the higher speed level, an illustration which can be quite plainly extended to any numbers of blocks at each of the shown levels, said embodiment further disclosing a "higher speed" level controlled by instruction processors.

FIG. 1, represents partly the highest speed levels (i+1) and (i) of a hierarchy of memories. As indicated, this hierarchy includes at least one level which is even less fast that (i+1), namely the (i+2) level, whereas the (i) level is faster than the (i+1) one. A block of a given level exchanges its information with a plurality of blocks of the faster contiguous level by an omnibus connection, referred as "BUS" between the levels (i+2) and (i+1) and between the level (i+1) and the level (i) in the figure.

Only one block of memory Bp and its control processor PBp are represented at the (i+1) level. At the (i) level, there are represented two blocks of memory bj and bk and their corresponding control processors Pbj and Pbk. It is assumed that Pbj and Pbk are instruction processors which handle task programs processing the information recopied from the Bp block of the (i+1) level.

It is assumed that the blocks which are shown are paginated, and that each page by itself is fragmented. For purposes of illustration, the Bp block has x pages, from P1 to Px, and each page consists of n fragments. The bj and bk blocks contain z pages each, from p1 to pz, and each page consists of q fragments. It is not imperative that bj and bk have the same number of pages of the same individual capacities.

A table Tp, preferably made in a fast technology, is associated with the control processor Pbp. This table is organized as follows: In AP, the numbering of the pages of the Bp block, in other words x registers addressed from AP1 to APx; in each "line" (entry), as many places of bits as there are blocks, let us say m, of the higher speed level exchanging information with the BP block, boxes b1 to bm. For the sake of clarity, a read-write register ELTp is shown, associated with table Tp. This register could be omitted, if the readings from the table are not destructive, but static, and if the writings can be made (entered?) directly. Each box from b1 to bm of each line of the table can receive a bit, representing a binary (logic) value of "1" or a value "0". The presence of a bit of a value of "1" at one these places will indicate that there exists at least one extract or fragment from the page addressed in AP copied in at least one block of the higher speed level, which itself is addressed from b1 to bm. The bit of the "1" value will be marked in the table at the corresponding case by the control processor each time a read-out is made in the Bp block on a request from one of the blocks of the (i) level from b1 to bm. The control processor determines the address of the block of the higher speed level and activates a circuit R, which places the value "1" mark at the addressed place. This bit will be put back to zero by activating an EW circuit, which will force the 0 value and therefore will turn the addressed bit back to zero. The conditions of this return to zero will be specified later on, since the command signal is received by PBp of the corresponding block b of the higher speed level. An OU circuit (OR function) is associated with the part b1 to bm of the write-read register ELTp. Consequently, at each consultation of a line of the table there will be a signal sent to the control processor indicating whether there exists an extract or extracts of the page addressed in AP in one or several other blocks of the higher speed level, the output 1 of the OU circuit being activated, or whether there is no such output, the output 0 of the OU circuit being activated.

It can be noted that since in this table a value "1" existing in any of the b1 to bm boxes of a line does not give a count of the number of extracts it would not be necessary to repeat the command for each extract read in Bp, which is to be directed to the same block of the higher speed level. It is however more simple to let the command operate. After a first marking of extract in one of these places in the addressed have of the table, the command will merely confirm the value "1" at that place. This is preferable to overloading the control processor an arrangement discriminating between the first notation and the following ones.

Of course, if it was considered useful to identify the extracts, each place from b1 to bm should be provided having a capacity of z bits, if one designates by z the number of pages of each of the blocks from b1 to bm of the higher speed level, which exchanges the information with Bp. Indeed, an extract from Bp, namely a "fragment" of a page of the Bp block fills one page of the b blocks of the higher speed level, at least in an usual establishment of the system. Such extension of the capacity is obviously removed in the preferred use of the invention, where the extracts in Tp are not accounted for.

The writings and readings in the memory block Bp are done in the usual way by the command of the address registers RA and of the write-read registers REL from the control processor PBp.

At the higher speed level (i), there are represented two memory blocks bj and bk and their control processors Pbj and Pbk, which are considered to be commanded by the instruction processors Pj and Pk which carry out the tasks of their programs.

In certain previous systems, it was customary to associate with each of these control processors a table of status words having as many "lines " as there were blocks. Within these status words and among the indices which constitute these words the state, one finds usually a bit of the "validity" index, V, which is turned to "1" each time the page p concerned is "invalidated" by the control processor of the block (either from a local decision as well as from an order received from the lower speed level). One finds there also a bit of an M index, normally set at 0, and turned to 1 when the information is modified by the processor of local management, or is signalled to it as being modified at the higher speed level. For certain modalities of practising the invention, one will find also in the table an exclusion index, let us call it X, which will indicate, when put at 1 by the control processor of the block, that the information has been obtained from the lower speed level in an exclusive way, and that its access at this lower speed level is temporarily excluded for any other block of the higher speed level. When used, this index will be placed responsive to a purge order, which follows a request for reading in Bp by a block b of the higher speed level.

The V and M indices have already been used in certain systems which were proposed previously, in order to provide for coherence of the information flows between two contiguous levels of a memory hierarchy. It is not useful to give particulars of such systems in fact, because in fact they actually are outside of the proper scope of the invention, even though it may be advantageous to utilize such indices when applying the invention in such fashion as to increase even more performance of the system of coherent management, which the invention provides for.

In particular, the validity index V, which is ordinarily used even independently of any problem of coherence and of any problem of hierarchy of memory, is advantageously taken in consideration in a purge order and in an updating order sent by the control processor of the block of the lower speed order to control processors of the blocks of higher speed order, which exchange information with it. A purge order will result in an updating in Bp and thereafter in an invalidation of the fragments of the information concerned in the blocks of the higher speed level, which have copies of them. An updating order will not be carried out in a block of a higher speed level, unless the validity index of the information is at 0. In addition, if the modification index M is present in the information, the purge order will send the modified information to the lower speed level before applying the invalidation. An updating order will not send a valid information to the lower speed level unless the modification index M is at 1 (after that, said index will be turned to 0).

Therefore, the indices V, M, and X are to be applied to each page p of a block of the higher speed level in the table of status words associated with the control processor of this block, so that a consultation of this table addressed by page numbers of the block, these indices could be verified and modified directly.

However, primarily for purposes of the invention, there must exist for each block of the higher speed level an identification table of the page numbers of the block of the lower speed level, the extracts of which are present in this block, and an accounting table booking the numbers of these extracts, plus an identification of the pages of the block of the higher speed level which contain these extracts.

There will be normally two separate tables, one for the "normal" function of identification of the states of the information contained in the pages of the block of the higher speed level, the other for the function which is "special to the invention i.e.", the identification and accounting of the extracts of the block of the lower speed level, and identification of their location in the block of the higher speed level.

For the sake of the clarity of the description, it appeared to be advantageous to present a table which "fuses together" these two separate tables, and one such "fused" table which is shown in FIG. 1, in Tj for the bj block and its processor Pbj, and in Tk for the bk block and its processor Pbk. In that case, such a table of associative addressing can contain by line (entry) a page address of the block of the lower speed level from AP1 to APx, the number of extracts CE of that page which are present in the block of the higher speed level, and as many places as there are pages of the block of the high speed level concerned, from p1 to pz, where there may be written one address p and one mark (.) indicating the presence of an extract of the AP page on the page p, followed by the three indices specified above, V, M, and X. Therefore, the address register ad will be able to receive an APB address or a p address to bring the content of a line selected in this way to the writing-reading register el.

The said write-read register el has its place, which receives the account of extracts CE, equipped with a decoder with two outputs, one (0) indicating an absence of extracts, and the other (0) indicating that abstracts are present. The output (0) is connected to an input of the control processor Pb. The output (0) is connected with a control input of a gate g, which is unblocked when the output (0) is activated. The output of the gate g is connected to a generator of bit $-1$, marked $(-)$, the output of which is directed to the register el to decrease gradually by one unit the count of CE extracts at each ejection of a fragment present in the block b, signalled from the control processor Pb. A generator of bit $+1$, marked by $(+)$, has its output connected to the register el in order to increase gradually by one unit the CE count, when this generator is activated by the processor Pb.

If the CE location contains as many boxes of bits as there are fragments, let us say n, of page P of the block Bp, the decoder is reduced to an OR circuit OU, and the generators $(+)$ and $(-)$ merely act to write or erase the bits in the boxes, which are identified during the addressing of the table.

Each block of the higher speed level is controlled by the processor Pb through the address register ra and of the write-read register rel of the block b.

The mechanism of the management of the table can be described as follows:

Each time an item of information is recopied in a block of a higher speed level at the request of its processor Pb, a presence bit is "entered" in the place CE of the address line AP, from which comes the page fragment of the block Bp, from the activation of the bit generator $(+)$ by the control processor, which has called the content of the address line AP in the register el of its table T. At the same time, it will mark a bit of the presence of the fragment at the address p of the page of the block b on that line, and implement it with an index $V=0$, with an index $M=0$, and with an index X, which may be either 0 or 1, depending as the case may be.

Each time an item of information is "abandoned" without having been modified at the high speed level, the processor will activate its connection to the generator $(-)$, while bringing into el the content of the line addressed by the page p, where this information is located. As a result, the count of extracts CE is decreased by one unit and the page mark is erased, or at least its bit V is commuted to 1 for invalidation. The same will happen for any information which is to be recopied at a lower speed level. When the gradual decrease brings the count of CE to zero, the activation of the output (0) of the decoder results in an ejection signal from the processor routed to the block Bp of the lower speed level, said signal being, combined with, or preceded by, the request of rewriting the information in the block Bp, when the test of the bit M has shown that the information had been modified. In addition, when necessary, the index X is then brought back to zero.

Of course, any modification of information is noted at M, when the instruction processor connected with the block has decided to make that modification.

Each signal of ejection from a block b of the higher speed level is treated by the control processor PBp by erasing the mark of presence of the information at the place of the register of the address AP assigned to the block b, which signals the ejection.

Therefore, keeping up to date the specified above tables, as well in the block of the lower speed level as in the blocks of the higher speed level makes it possible to know automatically at any moment the distribution of information coming from the block Bp among the blocks b of the higher speed level, and the state of this information. In order to provide for the coherence of management of the information, with the elementary mechanisms described above, it suffices to define their orders of automatic control in the processors.

Before defining several sets of such orders for demonstrating the flexibility of the system of maintained coherence as provided for in the invention, it should be noted that any communication between the block B of the lower speed level and the blocks b of the higher speed level, and reversely, any communication between a block b of the higher speed level and the block B of the lower speed level passes through the interface BUS of the higher speed level, and that during each of these communications these "bus" transport at the same time a complete address containing the address of the page of the block of the lower speed level and the position of the information on that page, as well as the information as it is transmitted, if any, and the nature of the order which was carried out or which is to be carried out. The identity of the requesting block of the higher speed can be included in the complete address referred to above, or it can be deduced from the call line of the BUS, which is allotted to this block. Therefore, this means that without any additional material there exists in fact a possible intercommunication among the blocks b, which can utilize advantageously certain operational modalities of the invention.

FIGS. 2 to 5 make it possible to define these operational modalities. Each of these figures shows, from I to V, different stages of exchanges between the block Bp of the lower speed level (i+1) and two blocks such as bj and bk of the higher speed level (i), under the command of the processors Pj and Pk of this higher speed level.

All the indices of the tables are not necessarily used in these operational modalities. The index V is sufficient for the modalities of FIGS. 2 and 3, the indices V and M, as well as the index X are sufficient for the modality of FIG. 4. FIG. 5 alone uses the three indices V, M, and X.

Figure 2:
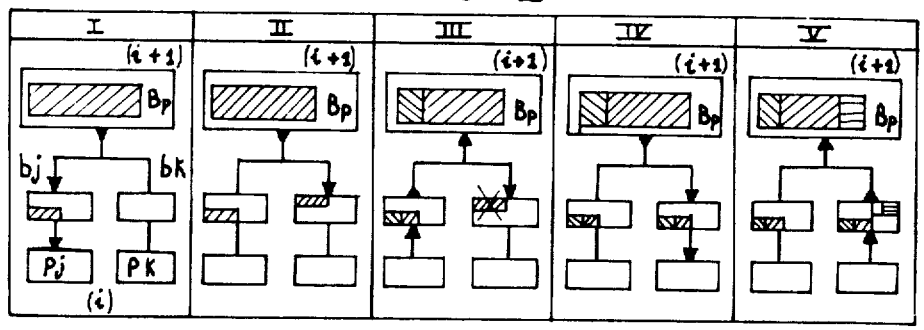
FIGS. 2 to 5 shows four illustrative examples of the use of the embodiment shown in FIG. 1.

FIG. 2 concerns the case where any modification of an item of information at the higher speed level brings immediately up to date the memory block Bp. In frame I, a group of information, for example a page of a high-speed block, has been readout in Bp and recopied in bj. In the frame II, the same group of information has also been recopied in bk. When, frame III, the items of information in bj have been at least partly modified, they must be "erased" from bk, after being sent back to Bp to for immediate updating (program of the processor Pj). According to the description given above, Bp has issued a purge order. This order found in bk only items of information which had not been modified, and consequently it has resulted in invalidation of the information by Pk. If Pk needs the information which has been invalidated, it will request Bp again to supply it, and as a result it will acquire modified information which is "up to date" in Bp. The frame V merely shows that afterwards Pk can obtain from Bp other information without disturbing the block bj, because it only reads the information.

When the request of bringing the information up to date is received, the control processor of Bp has erased the registration of the presence of information in its table Tp for the block bk, having entered these presence recording marks in the course of the operations I and II. It has re-registered this entry in the operation according to the frame IV, without "purging" bj.

Figure 3:
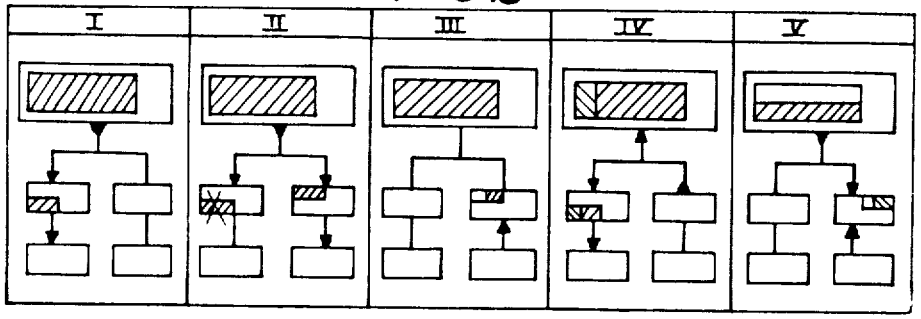

FIG. 3 shows the modification of the process, when Bp is not brought up to date immediately with modified data.

In that case, when after a group of data has been loaded in bj (for example), I, Pk requests the same information, the information is delivered to it, but since the registration of presence in bj is entered in the table Tp, a purge order, resulting in an invalidation of this group of information in bj, is transmitted to Pj, frame II. Pk can then modify data of this group of information, frame III, without disturbing Bp and bj. But if Pj, frame IV, requests this information again, Pk is requested to bring it up to date, because the registration of presence of the information exists in the table of Bp. Bp is brought up to date, and bj receives modified information. It can get it at the same time as Bp because of the presence referred to above on the "buses" of the level (i). The frame shows the same state as the frame V of FIG. 2.

Figure 4:
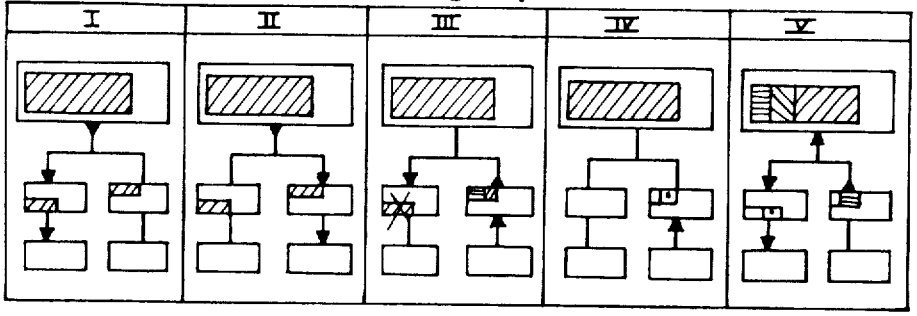
Figure 5:
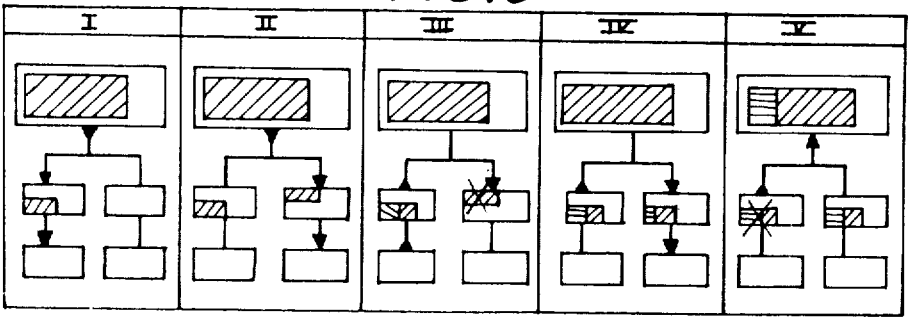

FIG. 4 shows an other modification of the process, when Bp is not brought up to date immediately with of modified data, and when one allows duplication of non-modified data in several blocks of the fast level.

The frames I and II are identical with those of FIG. 2, but these transfers are carried out on an exclusive basis, which means that the index X set at 1 both in bj as well as in bk. At the first modification of data in bk, frame III, the data in bj are invalidated on the basis of a test of the existence of the record marks of presence in the table of Bp, but without updating in Bp, by an order of invalidation issued by Pk, because in that case the X and M indices are both set at 1 by Pk. Pk sets the index M of the given data at 1 in its table Tk. Subsequent modifications are not all signalled, frame IV, because index M is already at 1 for the group of data. When Pj requests the same group of data from Bp, then the control processor of Bp requests an updating, but without invalidation in bk. In bk, the index M is set back to zero. Therefore, the same versions of the information concerned exist in Bp, bj, and bk, and we are back in the condition of frame II.

FIG. 5 shows also an other variant, which makes it possible to exchange modified information directly between the blocks of the fast level without updating the Bp memory of the lower speed level.

The frames I and II are identical with those of FIG. 4, including the marking of index X. When a modification is made in bj, frame III, the index M is set at 1 in the table Tj. If table Tp contains several bits on 1 for the block bj, and after the Pj has issued an invalidation order, the group of data of the same address Ap is invalidated in Bk, because the indices X and M would then be both set at 1.

If then Pk requests again this group of data, frame IV, the requests made by Pk produces a purge in bj, which resets index X at zero, but not index M in that block. Bp is not brought up to date, and the modified data are recopied directly in bk, where index M is set at 1 for these data. Since no recopying was done in Bp, the data in bj are not invalidated. Therefore, in that case there exist in the blocks of the higher speed level two sets of data, which are identical with each other, but do not have the "current" version in the block of the lower speed level. In the table associated with Pj, index M is kept at 1, but index X is reset to 0.

When afterwards the group of data has been completely used in block bj, the ejection signal is sent to the lower speed level, accompanied by a request for writing, because M = 1. Thus the Bp memory is brought up to date frame V.

To sum up, the system described above provides for the following two conditions, and therefore for coherence, regardless of the modality followed in setting it up:

—When a reading order by a processor concerns an item of information which is absent from its block of memory, and the control processor of the block of the lower speed level detects in its table that the information exists in other blocks, (at least in one of them) of the higher speed level, an instruction is carried out to update the block of the lower speed level.

—When a writing order issued by a processor concerns information which is absent from its memory block, or is present there, but with its index M set at 0, and when consultation of the table associated with the block of the lower speed level detects the presence of the information in other blocks, an instruction is carried out to purge these other blocks.

If it is so desired at the higher speed level, index M may not be applied globally to a page p. Instead, the table may distinguish between fragments of this page from 1 to q, and an index M may be assigned to them individually. The result is—as a counter part of this increase of material of the equipment—a number of to the operations of updating of the block of the lower speed level which one can hope to be smaller.

I claim:

1. In a hierarchal memory data processing system having a plurality of memory levels, each level being divided in separate data blocks, a page of each block of a higher speed level equalling a fraction of a page of each block of the next lower speed level, and each block of the lower speed level being arranged for exchanging information with blocks of the higher speed level, a system of coherent management of the exchanges between any two contiguous levels, one of higher speed than the other, comprising control processor means for managing said blocks at each level, said control processor means having at least one associated table containing status words for each block and means for updating said table responsive to each read-out and write-in request in said block and at each ejection of data from the block, wherein each control processor of a block of the lower speed level selectively, when receiving a read-out request from a block of the higher speed level, on consultation of its table, purges the blocks of the higher speed level of the fractions of the data addressed in the read-out request by repatriating the copies of such fractions existing in the blocks of the said plurality, accompanied by a decreasing one of the count in said table, of the fractions of a block in said higher level which has not yet been repatriated to the lower level, wherein each control processor of a block of the lower speed level selectively, when receiving a write-in request from a block of the higher speed level, on consultation of its table, updates the copies of fractions of the data addressed in said write-in request existing in the blocks of the higher speed level, and wherein:

each table associated to a block of the lower speed level comprises as many entries as are pages in the block and, in each of its entries, comprises means to memorize the read-outs from the page corresponding to this entry and the identifications of the blocks of the higher speed level to which the read-outs send copies of fractions of the page, and, each table associated to a block of the higher speed level comprises as many entries as are pages in the block of the lower speed level with which it is in data exchange relation and, in each of its entries, comprises means to book an updated count of the copies of the fractions of the page of the block of the lower speed level corresponding to the entry and to concomitantly memorize an updated identification list of pages of the block of the higher speed level which contain such copies, and comprises means for signalling the passage to zero of each of the said counts to the respective blocks of the lower speed level, whereby each control processor of a block of the lower speed level is kept posted of the status of the copies of all fractions of data of its block within the blocks of the said plurality of the higher speed level.

2. A system according to claim 1, wherein each table entry associated to a block of the higher speed level comprises means for marking a validity index signifying no need for repatriation at each identification place of the said lists and means to decrease by one unit the count in the corresponding entry when said validity index is turned to invalidation by the control processor of the said table.

3. A system according to claim 2, wherein each table associated to a block of the higher speed level comprises means for marking a modification index at each indentification place of the said lists and means to turn the said index to a non-modification value responsive to the repatriation by the associated control processor of the content of the corresponding page of the higher speed level block to the block of the lower speed level from which this content had been copied, said control processor including means to solely repatriate such a content when marked by both validity and modification indexes in the table.

4. A system according to claim 2, wherein each table associated to a block of the higher speed level comprises means for marking at each identification place of the said lists an index significant of the fact that the corresponding page fraction has been obtained on an exclusive basis from the block of the lower speed level and means to turn this index to a non-significant value once the concerned information has been locally modified and the control processor of the table informs the table that all corresponding data had been invalidated in the other higher speed level blocks of the said plurality exchanging information with the said block of the lower speed level.

* * * * *